Nov. 10, 1970 H. DRECKMANN 3,539,302
APPARATUS FOR RAPID ANALYSIS OF TRACE GAS
Filed April 10, 1968
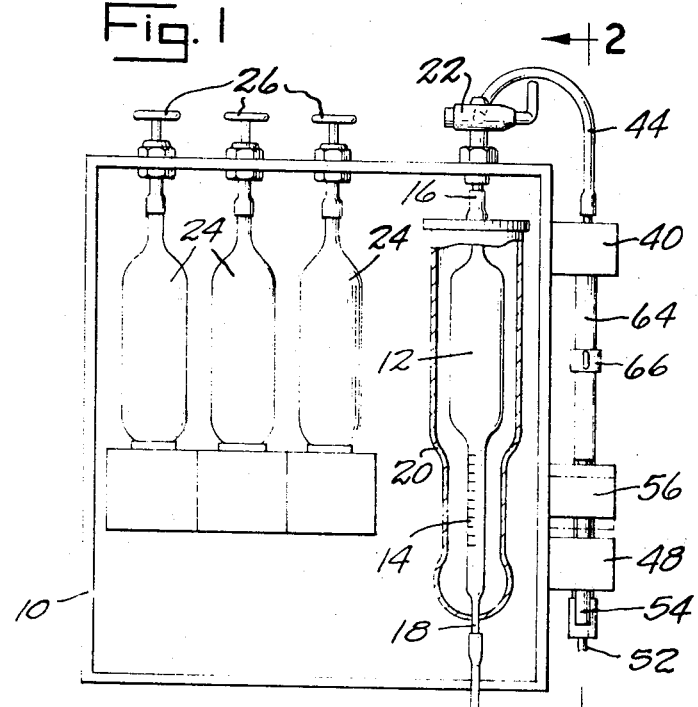
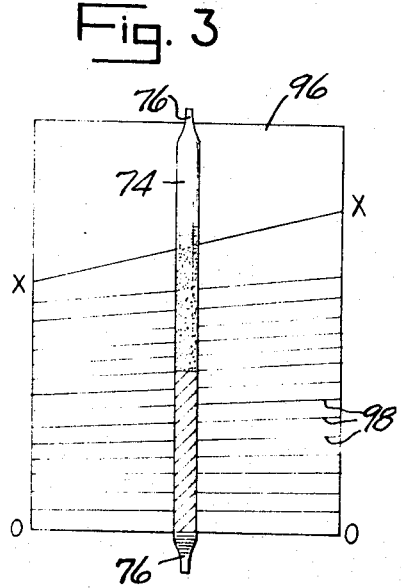
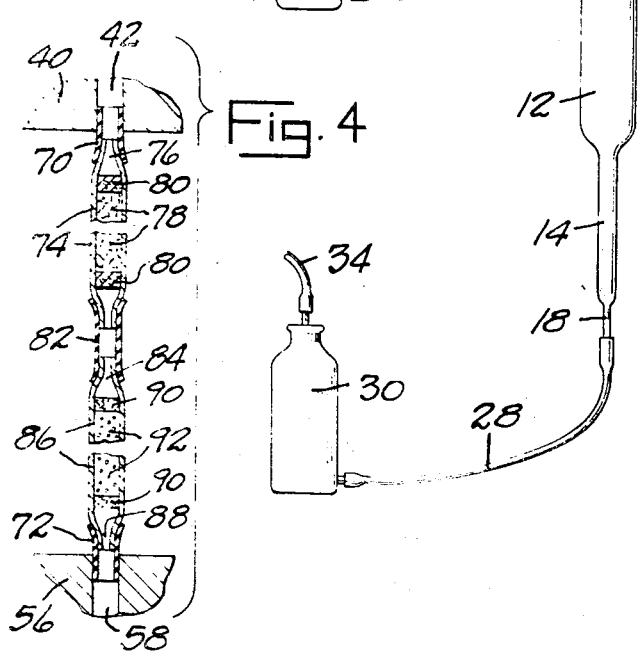
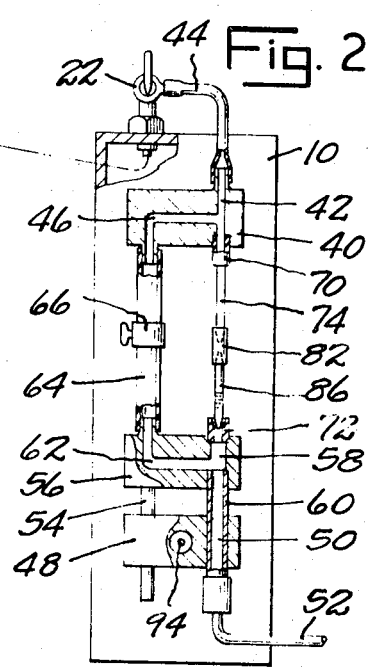
HUBERT DRECKMANN
*Eugene C. Knoblock*
ATTORNEY United States Patent Office 3,539,302
Patented Nov. 10, 1970

3,539,302
APPARATUS FOR RAPID ANALYSIS OF TRACE GAS
Hubert Dreckmann, Michigan City, Ind., assignor to The Hays Corporation, Michigan City, Ind., a corporation of Indiana
Filed Apr. 10, 1968, Ser. No. 720,295
Int. Cl. G01n 31/22
U.S. Cl. 23—254
9 Claims

ABSTRACT OF THE DISCLOSURE

Apparatus for rapid analysis of trace (p.p.m.) concentrations of a gas in a gas mixture using the measuring burette and leveling bottle of an Orsat type gas analyzer for measuring a chosen volume of a gas sample. Valved conduit means between the burette and a gas sample source provides two passages in parallel, of which one is valved and the other includes a removably mounted transparent container of a material which is color sensitive to the trace gas to be measured.

SPECIFICATION

This invention relates to apparatus for the rapid analysis of trace gas, such as sulphur dioxide.

Orsat apparatus is widely used for the accurate analysis of carbon dioxide, oxygen, carbon monoxide and other gases in volume percent concentrations in a gas sample. It is frequently desirable to test the same gas sample for trace (p.p.m.) concentrations of a gas in a gas mixture, such as sulphur dioxide, which commonly is a byproduct of combustion processes and the like in connection with which measurements of carbon dioxide and carbon monoxide are made. The analysis of gases to ascertain the presence of trace concentrations has heretofore required the use of apparatus different than Orsat apparatus, for example, apparatus such as disclosed in U.S. Pats. 3,131,030 dated Apr. 28, 1964 and 3,223,487 dated Dec. 14, 1965. The requirement for use of separate apparatus to measure different components of a gas is inconvenient and time-consuming and entails a duplication of expense for the apparatus required.

The primary object of this invention is to adapt the Orsat type gas analyzer, which in its known form is suited for the measurement of volume percent concentrations, to the measurement of traces, i.e. p.p.m. concentrations.

It is a further object of this invention to provide an Orsat type gas analyzer with color sensitive means responsive to a trace gas permitting its use to determine accurately the concentration of a trace gas contained in a gas sample.

A further object is to provide a device for analyzing a gas sample to determine the presence of trace gases and in which the gas sampling and sample measuring and displacing means of an Orsat type analyzer are utilized.

A further object is to provide a device of this character which is simple in construction, inexpensive, accurate and trouble free in operation and convenient in use.

Other objects will be apparent from the following specification.

In the drawing:

FIG. 1 is a view of the apparatus in side elevation.

FIG. 2 is a sectional view taken on line 2—2 of FIG. 1 and illustrating schematically the connection to the parts shown along said section line of a measuring burette and a leveling bottle of an Orsat type gas analyzer.

FIG. 3 is an enlarged detail view illustrating the manner in which a reading of the percentage of trace gas is made.

FIG. 4 is an enlarged fragmentary detail sectional view taken on line 2—2 of FIG. 1.

Referring to the drawing which illustrates a preferred embodiment of the invention, the numeral 10 designates the frame or housing of a conventional Orsat type gas analyzer. The frame mounts a measuring burette 12 which preferably includes a calibrated portion 14 and which has an upper conduit 16 and a lower conduit 18. The burette is preferably enclosed within a water jacket 20. Conduit 16 is controlled by a multiple port valve 22. The Orsat frame mounts one or more reagent containers 24, each having a control valve 26 connected in a line (not shown) communicating with the burette conduit 16 under the control of valve 22, so that a gas sample of measured volume as determined by the burette can be directed to a selected reagent container for absorption of a predetermined component thereof by the contained reagent in the manner well understood in the art relating to the Orsat type of gas analyzer.

The lower conduit 18 of the burette has a flexible conduit 28 connected thereto and in turn is connected to a fitting at the lower part of a leveling bottle 30. The bottle 30 preferably has a stopper 32 which is apertured to receive with a sealed fit the end portion of a conduit 34 in which is connected a nozzle 35 and to which is connected an aspirator bulb 36 of well known type which is vented to atmosphere and has a control valve (not shown) and is adapted to pump a gas sample into the leveling bottle 30 and in the connected burette 12.

Frame 10 mounts a fitting block 40 at one end thereof preferably adjacent to the burette 12. Block 40 has a vertical passage 42 therethrough. A conduit 44 connects one part of the valve 22 with the passage 42. A second passage 46 is formed in the block 40, being a branch passage communicating with passage 42. Spaced below the fitting block 40 is fixedly mounted a block 48 which has a passage 50 therethrough. Block 48 has one or more vertical passages therein (not shown) in which pins 54 are frictionally engaged and supported at selected elevation, which pins 54 project from the lower end of a second fitting block 56. Block 56 has a vertical passage 58 therethrough communicating by means of a conduit 60 slidable in the passage 50 in block 48 with a sample conduit 52 extending to a source of gas to be sampled. A branch passage 62 is provided in block 56 in communication with and branching from passage 58 and substantially vertically aligned with the branch passage 46 of block 40. The blocks 40 and 56 are connected by a flexible conduit 64 whose opposite ends communicate with the branch passages 46 and 62. A clamp 66 is carried by the flexible conduit 64 spaced from its ends and is selectively operable manually to open or to close the flexible conduit 64 at the will of the operator.

A short tube 70 formed of rubber or synthetic rubber or other resilient material is mounted in the lower end of the passage 42 of the upper fitting block 40 and projects therefrom. A similar short resilient tube 72 is carried by the lower fitting block 56 in communication with passage 58 thereof and projects upwardly from block 56. The tubes 70 and 72 are located in substantially axial alignment. A transparent elongated tube or vial 74 has opposed reduced end parts 76 which are normally sealed and the upper end part of which is adapted for snug sealing fit in the upper tube 70. The tube or vial 74 contains chemically treated particles 78 as a filler, which particles are held in place in the vial by porous end plugs 80. The filler particles are preferably non-porous and are treated with a chemical adapted to react in the presence of the trace gas, such as sulphur dioxide, by a color change whose longitudinal extent is proportional to the percentage of the trace gas being tested. The lower reduced end of the transparent tube or vial 74 is connected by means of a flexible tube 82 formed of rubber or rubberlike material with the reduced upper end portion 84 of a lower tube or vial 86 having a lower reduced end portion 88. The reduced ends of 84 and 86 of tube or vial 86 are normally sealed. Porous end plugs 90 positioned within lower tube 86 confine a hygroscopic filler 92, such as diatomaceous earth, with or without a chemical treatment.

The device is conditioned for operation by assembling the tubes or vials 74 and 86 in the manner illustrated in FIGS. 2 and 4 after the seals at the reduced ends thereof have been broken. The lower block 48 is preferably provided with an aperture or recess 94 into which the sealed reduced ends of the tubes or vials 74 and 86 may be inserted for breakage thereof by swinging of the tube at an angle to the axis of the aperture. The assembly of the tubes or vials 74 and 86 by means of the resilient tubes 70, 72 and 82 is made possible by the vertical adjustment of position of the lower fitting block 56 which accommodates alignment of parts 70, 74, 82, 86 and 72 while said parts are loose. Thereupon movement of the block 56 in an upward direction effects sealing contact of the connected parts and a leakproof path of gas flow between passages 58 and 42. In the preferred form the flexible branch conduit 64 is of a length greater than the normal or operative spacing between fitting blocks 40 and 56 so that it is flexed or bowed in the operative position of the parts and is extended or straightened when the fitting block 56 is lowered. It will be understood that this is optional, however, and that the conduit 64 may be disconnected from one or the other of the fitting blocks when the fitting blocks are separated to facilitate mounting and dismounting of the tubes 74 and 86.

In the use of the apparatus, after the parts have been assembled and the sample conduit 52 has been connected with the gas sample source, the clamp 66 on the flexible conduit 64 will be opened and the gas sampling means of the Orsat analyzer will be manipulated, as by operating aspirator bulb 36, for the purpose of drawing gas from sample conduit 52 into the burette 12. Inasmuch as the tubes or vials 74 and 86 have reduced end portions and also contain filler material resisting gas flow, the flow of gas from the sampling tube 52 to the burette 12 will occur through the branch conduit 64 and branch passages 62 and 46 with negligible flow of gas through the tubes 74 and 86. One or more operations of the gas sampling means will preferably be performed for the purpose of purging the apparatus of residual gases prior to the measuring operation.

After the purging operation, the gas sampling means will again be manipulated to draw gas from sample conduit 52 through branch conduit 64 into the burette 12, by manipulation of the aspirator bulb 36. At this time an accurate measurement of the gas sample is made by observing the liquid level in the calibrated portion 14 of the burette 12 and by carefully selecting the level of liquid in the burette 12, as by operation of the aspirator bulb 36. Thereupon the clamp 66 is operated to close and seal the flexible conduit 64 against the flow of gas therethrough. The leveling bottle 30 is then elevated to cause liquid therein to displace the gas from the measuring burette 12. With nozzle 35 in line 34 and upon operating aspirator bulb 36, the gas sample is forced through tube 52, passage 60, vial 86 and tube 74. This causes the gas sample to be forced through the chemically treated trace gas-sensitive filler particles 78 in the tube or vial 74. These particles are of a character to discolor in response to the trace gas, with the discoloration occurring progressively from one end thereof toward the other end so that the length of the discoloration of the filler in the tube occurring during a predetermined period of time is a measure of the percentage of the trace gas or of the volume or quantity of the trace gas in the tested gas sample.

It will be understood that during the use of the apparatus for testing or analysis for trace gases the valves 26 leading to the reagent containers 24 will be closed. It will also be understood, however, that the apparatus permits the measurement of a given gas sample to determine the percentage of carbon dioxide and like components which are absorbed by the reagents followed by measurement of the residual gas sample for the trace gases by passing the residual gas through the tubes or vials 74 and 86.

The measurement of the trace gas is made by removing the tube or vial 74 from the apparatus and positioning it upon a measuring chart 96 which has a lower transverse line or edge O—O and an upper inclined transverse line or edge X—X. The tube or vial 74 is positioned upon the chart perpendicular to line O—O with the lower level of its filler 78 coinciding with the line O—O and with the upper level of the filler 78 coinciding with the line X—X as shown in FIG. 3. The level of the limit of discolored filler can then be read against spaced calibration lines 98.

The tubes or vials 74 and 86 are discarded after each usage thereof and fresh tubes or vials must be prepared for use by breaking the seals at the ends thereof and inserting them in the apparatus in the arrangement shown in FIG. 4 as described above.

While the preferred embodiment of the invention has been illustrated and described, it will be understood that changes in the construction may be made within the scope of the appended claims without departing from the spirit of the invention.

I claim:

1. Apparatus for rapid analysis of trace gas comprising
a measuring burette,
a liquid containing leveling bottle connected to said burette and manipulatable to draw gas into said burette and discharge gas therefrom,
conduit means for directing flow of gas from a gas sample source to said burette and including two parallel connected passage portions,
valve means for selectively opening and closing one passage portion,
said conduit means including a transparent tube defining a part of the other passage portion and containing chemically treated particles through which gas may flow and whose color is subject to change upon exposure to the trace gas to be measured in a part whose length is proportional to the quantity of said trace gas to which it is exposed.

2. Apparatus for rapid analysis of trace gas as defined in claim 1, and
a second tube connected in said conduit means in series arrangement with said transparent tube in said other passage,
said second tube containing a hygroscopic filler through which gas may flow.

3. Apparatus for rapid analysis of trace gas as defined in claim 1, and
means for removably mounting said tube in operative position connected in said conduit means.

4. Apparatus for rapid analysis of trace gas as defined in claim 3, wherein
said last named means includes a pair of fittings each having a primary passage therethrough and a branch passage,
means for adjusting the spacing between said fittings,
a second tube connecting the branch passage of said fittings and controlled by said valve means, and
means for releasably connecting the opposite ends of said transparent tube in communication with said primary fitting passages in one adjusted spacing of said fittings.

5. Apparatus for rapid analysis of trace gas as defined in claim 3, wherein
said last named means includes a pair of fittings each having a primary passage therethrough and a branch passage, means for adjusting the spacing between said fittings, a second tube connecting the branch passages of said fittings and controlled by said valve means, and a flexible tube projecting from each fitting and connected with the primary passage thereof, said tubes frictionally embracing opposite ends of said transparent tube in one adjusted spacing of said fittings.

6. Apparatus for rapid analysis of trace gas as defined in claim 3, wherein said last named means includes a pair of fittings each having a primary passage therethrough and a branch passage, means for adjusting the spacing between said fittings, a second tube connecting the branch passages of said fittings and controlled by said valve means, means for releasably connecting said transparent tube in communication with the primary passage of one fitting, a tube containing a drying agent through which gas may flow, means releasably connecting said last named tube in communication with the primary passage of the other fitting, and tube means releasably connecting said tubes in communication for gas flow sequentially therethrough.

7. Apparatus for rapid analysis of trace gas as defined in claim 4, wherein said second tube is flexible.

8. Apparatus for rapid analysis of trace gas as defined in claim 4, wherein said second tube is flexible and the valve controlling the same constitutes a selectively operable clamp adapted to squeeze said second tube to prevent gas flow therethrough.

9. Apparatus for rapid analysis of trace gas as defined in claim 1, and a rubber bulb and cooperating nozzle are connected to said leveling bottle and are operable to pump a gas sample through the transparent tube.

References Cited
UNITED STATES PATENTS

| | | | |
|---|---|---|---|
| 744,132 | 11/1903 | Tutwiler | 23—254 |
| 3,223,487 | 12/1965 | Grosskopf | 23—232 XR |

MORRIS O. WOLK, Primary Examiner

R. M. REESE, Assistant Examiner

U.S. Cl. X.R.

23—232